UNITED STATES PATENT OFFICE.

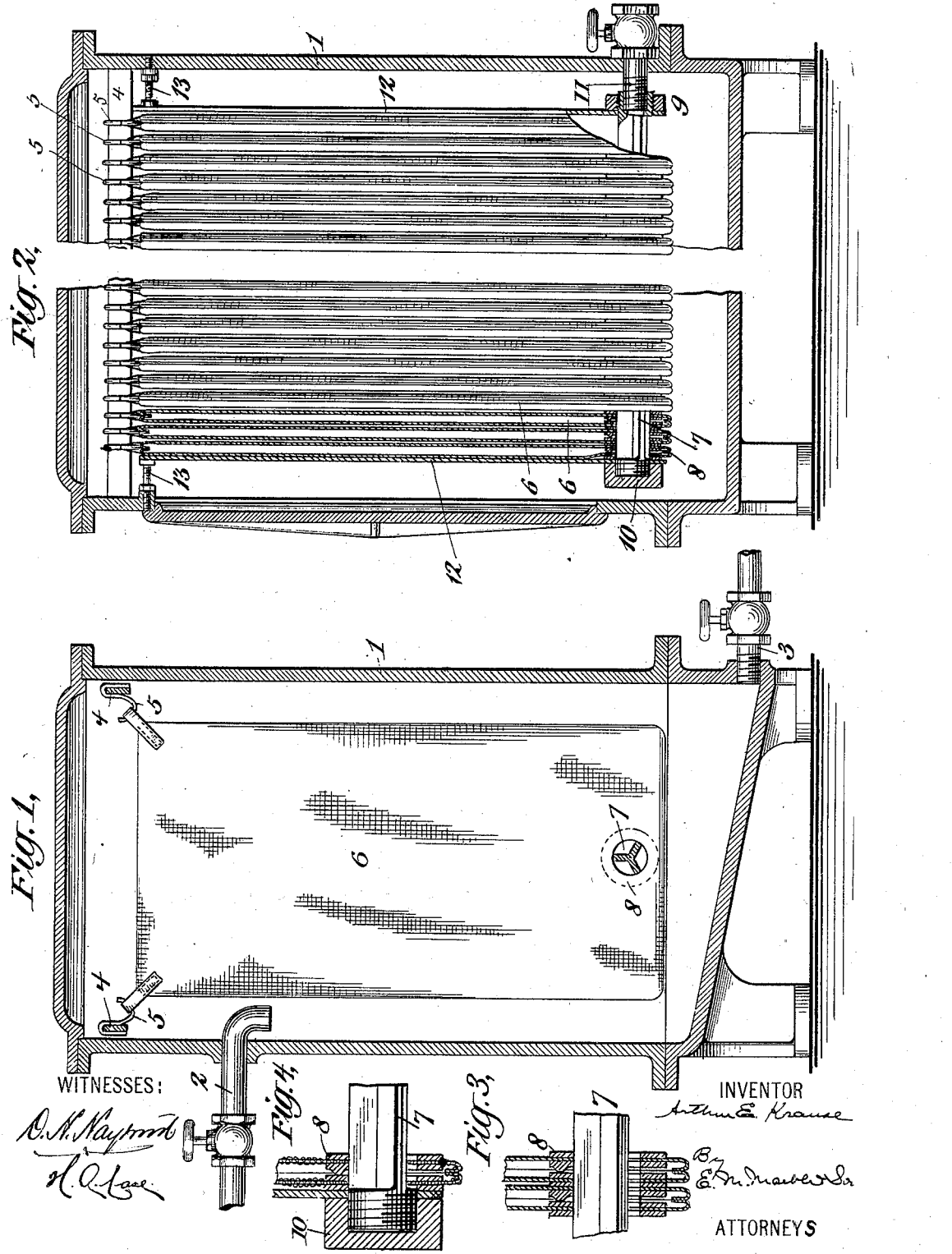

ARTHUR E. KRAUSE, OF JERSEY CITY, NEW JERSEY.

FILTER.

SPECIFICATION forming part of Letters Patent No. 647,099, dated April 10, 1900.

Application filed August 5, 1899. Serial No. 726,337. (No model.)

*To all whom it may concern:*

Be it known that I, ARTHUR E. KRAUSE, a citizen of the United States, residing at Jersey City, in the county of Hudson and State of New Jersey, have invented certain new and useful Improvements in Filters; and I do hereby declare the following to be a full, clear, and exact description of the invention, such as will enable others skilled in the art to which it appertains to make and use the same.

My invention relates to filters, and particularly to filters designed for removing oil from boiler feed - water, although the improved filter herein described is also applicable to the removal of sand, sediment, and impurities generally from water and to the filtration of all other fluids.

The filter herein illustrated and described is a modification of the filter illustrated and described in my application for Letters Patent of the United States filed July 13, 1898, Serial No. 685,816.

My invention consists in the novel means employed for carrying off the filtrate from a series of filter-bags supported within a filtering-chamber.

The objects of my invention are to improve the means employed for carrying off the filtrate from filter-bags supported independently of the means employed for carrying off the filtrate or which are suspended vertically within a suitable filtering-chamber, to make the filter as simple and inexpensive as possible, to provide great area of filtering-surface in proportion to the space occupied, to avoid liability to breakage of the filter-bags while in use, and to provide for the ready removal, cleansing, and replacing of the filter-bags. These objects are attained in the filter herein described and illustrated in the drawings which accompany and form a part of this specification, in which the same reference-numerals indicate the same or corresponding parts, and in which—

Figure 1 is a vertical transverse section of the filter. Fig. 2 is a vertical longitudinal section of the same. Fig. 3 is a detail view, on a larger scale than Figs. 1 and 2, illustrating the method of clamping the filter-bags about the hereinafter-mentioned carriers; and Fig. 4 is a similar view showing the use of filter-bags the cloth of which has a "pile" by which the adjacent surfaces of the bags are kept apart.

In the drawings, 1 designates the filtering tank or chamber, provided with an inlet-pipe 2 and drainage-pipe 3. It is also provided near the top with parallel supports or rails 4 for hooks 5, from which filter-bags may be suspended.

6 6 are filter-bags suspended from hooks 5 upon the rails 4 by means of loops secured at the corners of the bags; but any other suitable and convenient means for suspending or supporting the bags may be used instead of the particular means shown. The bags may be made of any suitable material, but a fabric having a more or less coarse mesh woven into its body is preferable. The bags extend nearly to the bottom of the tank 1 and at the bottom are provided with registering holes, through which passes a spider-shaped carrier 7. Within each filter-bag and mounted upon this carrier 7 are spacing-rings 8, arranged in pairs, one ring of each pair being provided with bosses to set it off from the adjacent ring, so as to permit the passage of fluid between the rings. Other spacing-rings are also located between adjacent filter-bags, so as to separate the bags from each other slightly. At one end the carrier is provided with a flange 9 and at the other end it is provided with a screw-nut 10. By screwing up this nut the bags and spacing-rings are pressed together, so that leakage of liquid from the space surrounding the bags into the grooves or channels of the carrier without passing through the bags is prevented. The grooves or channels in the sides of the carrier form, with the bags themselves and the spacing-rings, channels for the escape of the filtrate. The flange 9 is provided with openings forming continuations of these passages and communicating with the outlet-pipe 11, by which the carrier is supported, through which openings the filtrate passes into the pipe 11.

In the operation of the filter fluid to be filtered is admitted into the tank 1 through the inlet-pipe 2. The fluid then filters through the fabric of the filter-bags 6 into the interiors of said bags, becoming separated from its solid impurities as it does so, and thence passes between the spacing-rings 8 into the channels in the sides of the carrier 7, and so into the pipe 11. The pressure on the bags being from the outside inward, there is practically no liability to bursting of the bags. The method of supporting the bags and of carrying off the filtrate permits the placing of a relatively-large number of bags within any given space, thus affording large area of filtering-surface. It also permits the connection of bags of relatively-large size to the device for carrying off the filtrate, thereby increasing further the filtering area permissible.

The bags may be cleansed from time to time by a jet of water from a hose or by filling the tank 1 with clear water or other suitable washing fluid and by agitating such fluid in any convenient manner, the washing fluid and sediment being drawn off through the pipe 3, or a reverse current of water, steam, or other suitable substance may be admitted through outlet-pipe 11. When it is desired to clean the bags more thoroughly or to replace them, the nut 10 may be unscrewed and the bags slipped off from the carrier 7 without removing the carrier from the tank, or the carrier may be unscrewed from the pipe 11 and removed from the tank with the bags still on it.

To insure the maintenance within the bags and between adjacent bags of passages for the fluid, the fabric of which the bags are composed may have a pile, as has Turkish toweling, or layers of fabric having piled surfaces may be located within the bags or between them, all as described in my said application for Letters Patent, filed July 13, 1898, Serial No. 685,816.

I do not limit myself to the use of the particular form of carrier 7 illustrated in the drawings, but may employ for the purpose any device capable of being connected to the bags in such manner as to carry off the filtrate from within them.

In order to prevent bulging of the bags when fluid is passed through them in a reverse direction, as above stated, pressure-plates 12 may be provided at the ends of the series of bags mounted upon the carrier 7. The tank 1 may be provided with screws 13 to press these plates toward each other at points above the carrier 7.

In my said application, Serial No. 685,816, I have claimed the use of a series of filter-bags mounted transversely upon a suitable carrier, such as the carrier 7; also, the use of spacing-rings to separate the adjacent layers of fabric and preserve passages for the fluid; also, the use of bags composed of piled fabric or provided with layers of piled fabric for the purpose of preserving fluid-passages. I do not claim such inventions broadly herein. Therefore, Having thus completely described my invention, what I claim, and desire to secure by Letters Patent, is—

1. In a filter, the combination, with a series of filter-bags arranged to be surrounded by the liquid to be filtered, and connected to a common device for carrying off filtrate from within them, of means, independent of such device for carrying off the filtrate, for supporting the bags.

2. In a filter, the combination, with a series of flat filter-bags suspended at their upper ends, and means for so supporting them, of a device, common to the bags, and connected thereto near their lower ends, for carrying off the filtrate from within them.

3. In a filter, the combination, with a series of filter-bags, and a device for carrying off the filtrate, passing through transverse openings in said bags, of means for supporting the bags, independently of such device for carrying off the filtrate, and means for preventing the passage of unfiltered liquid into the filtrate.

4. In a filter, the combination, with a series of flat filter-bags suspended at their upper ends, and means for so supporting them, of a carrier, passing through transverse openings in said bags, forming with the bags channels for the escape of the filtrate, and provided with spacing-rings, pressure-plates at the ends of said series of bags, and means for pressing the plates, bags, and rings together.

5. A filter-bag, composed of flexible filtering material, closed at the edges, provided with means for suspending it, and provided also with openings in its sides for the connection of a device for carrying off the filtrate.

In testimony whereof I hereunto affix my signature in the presence of two witnesses.

ARTHUR E. KRAUSE.

Witnesses:
JAMES F. WHULEHAN,
HENRY WEIGAND.